Aug. 7, 1923.

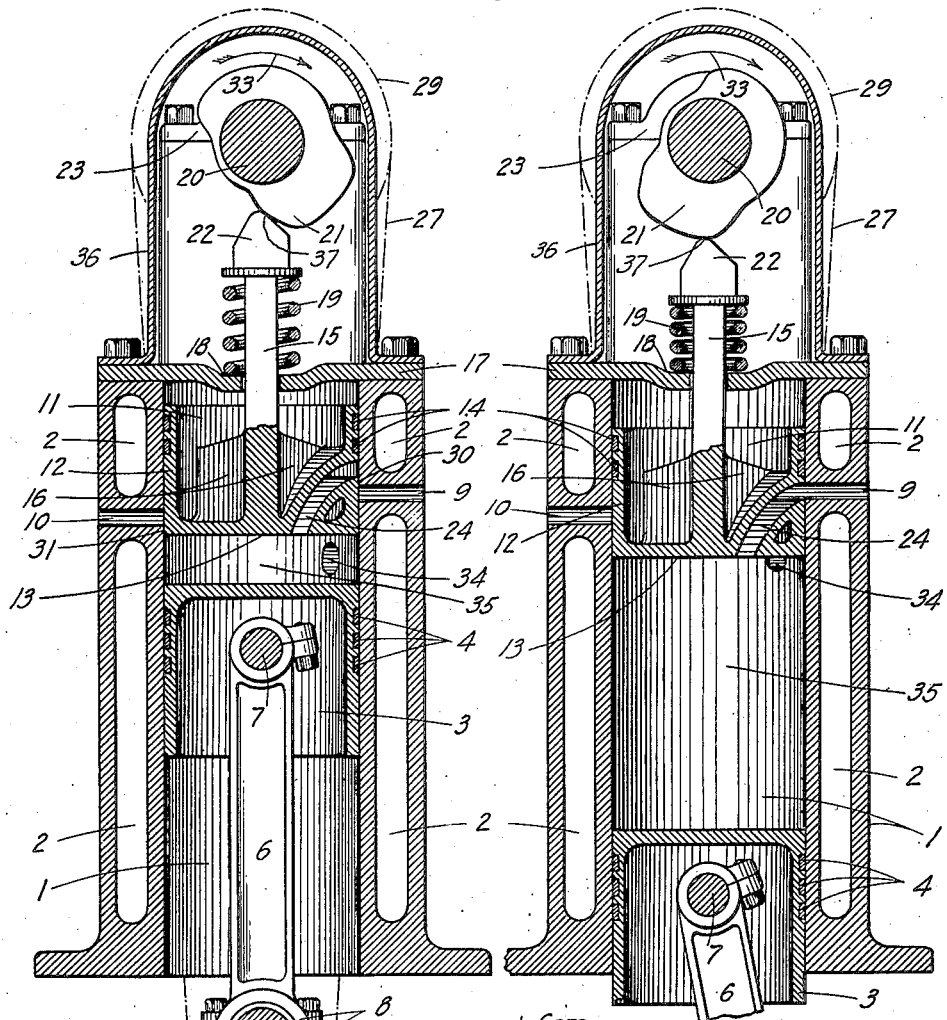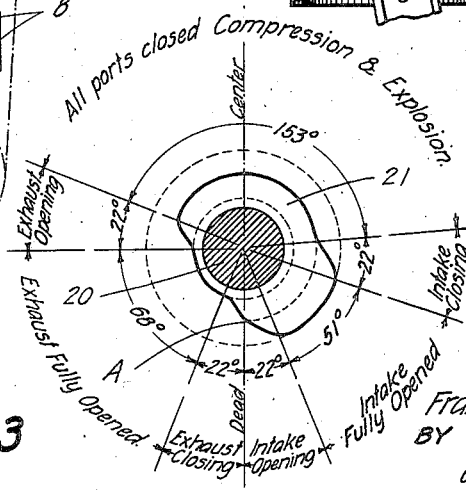
Fig. 1  Fig. 2  Fig. 3
INVENTOR
Frank C. Alarie

F. C. ALARIE 1,464,164

INTERNAL COMBUSTION ENGINE

Filed July 19, 1922  2 Sheets-Sheet 2

INVENTOR
Frank C. Alarie
BY
ATTORNEY

Patented Aug. 7, 1923.

1,464,164

UNITED STATES PATENT OFFICE.

FRANK C. ALARIE, OF TROY, NEW YORK.

INTERNAL-COMBUSTION ENGINE.

Application filed July 19, 1922. Serial No. 576,167.

*To all whom it may concern:*

Be it known that I, FRANK C. ALARIE, a citizen of the United States, residing at Troy, in the county of Rensselaer, State of New York, have invented new and useful Improvements in Internal-Combustion Engines, of which the following is a complete specification.

My invention relates to improvements in gasoline or similar engines and its object is to simplify the construction of engines of this character by reducing the number of parts, and to obviate the use of poppet valves by providing one efficient valve of the sliding type which will control both the admission and exhaust of the gases and will be operated directly by the natural forces developed in the cylinder of a motor of this type.

Another object is to provide an engine in which all annuli, or other means for opening or closing the ports, which project into the combustion chamber and thus prevent the head of the power piston from being brought very close to the head of the cylinder, are eliminated, so that the compression space may be reduced to any extent desired, or required by different fuels or different valve settings to secure a maximum of speed, power and economy.

In the ordinary poppet valve motor, considerable energy is spent in lifting the valves, particularly the exhaust valve, which must be raised, not only against the compression of the valve spring, but also against the pressure of the highly heated gases in the cylinder at the end of the power stroke which results in loss of useful power and a consequent reduction in efficiency. My invention contemplates the utilization of the pressure of the expanded gases to effect the opening of the exhaust port and the utilization of atmospheric pressure to assist the opening of the inlet port, thus increasing the efficiency of my engine.

Another object of my invention is to so design the intake passage for the fuel as to introduce the fuel into the combustion chamber through a relatively small orifice, thereby greatly increasing the velocity of entrance and securing a breaking up of low grade fuels into very fine particles and thus improving the explosive qualities of the mixture as it comes from the carburetor.

These, and other features and advantages will be apparent to those skilled in the art from the following description in connection with the accompanying drawings in which similar numerals refer to similar parts throughout the several views.

Figures 4, 5:
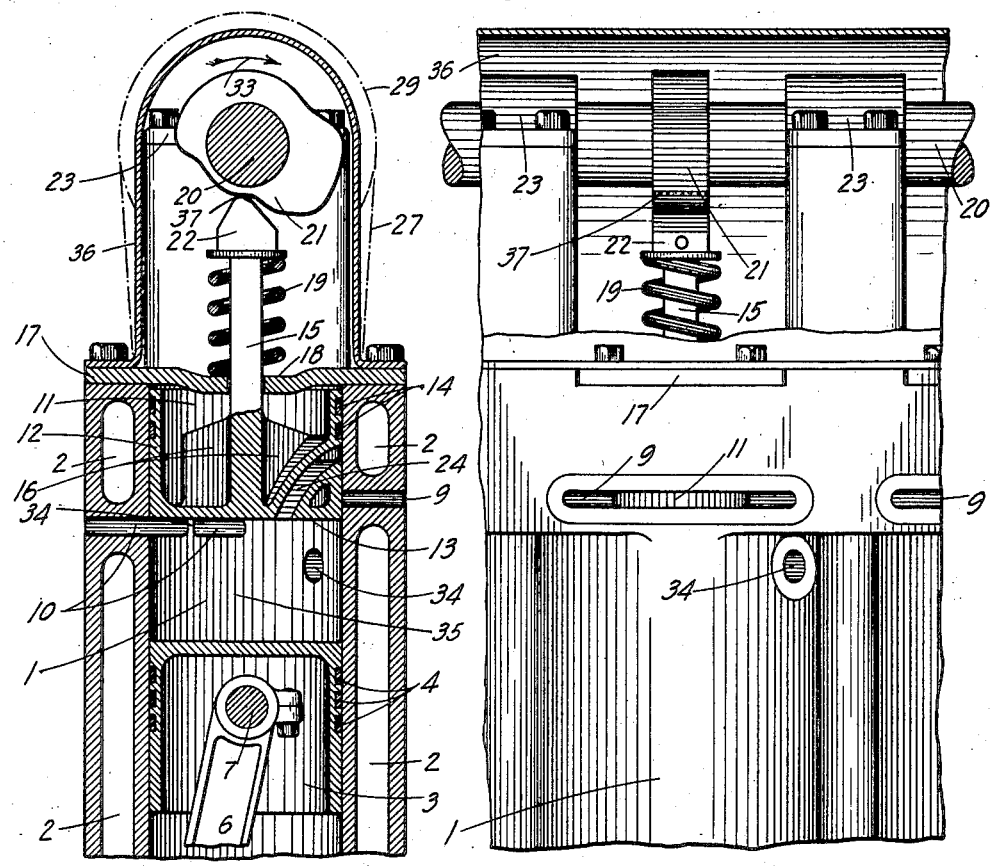
Figure 6:
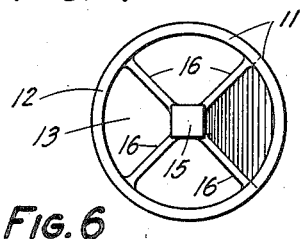
Figure 7:
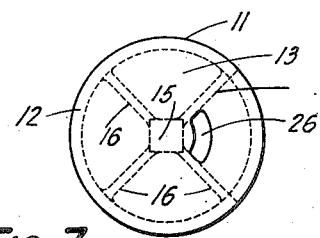
Figure 8:
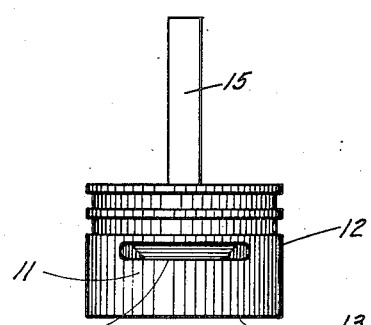

Referring to the drawings, Fig. 1 is a vertical section of one cylinder of my engine taken in a plane at right angles to the crankshaft, and showing the motor on upper dead center at the beginning of the fuel intake stroke; Fig. 2 is a vertical section similar to Fig. 1 but showing the relative position of the parts near the end of the intake stroke, and with the inlet port fully open; Fig. 3 is a section of the camshaft, taken in a plane at right angles thereto, and illustrates the sequence of the various features of the cycle; Fig. 4 is a vertical section similar to Figs. 1 and 2, and illustrates the relative position of the parts at a point near the end of the exhaust stroke, and with the exhaust port fully open; Fig. 5 is a fragmentary elevation view of the inlet side of my engine; Fig. 6 is a plan view of the port-operating piston; Fig. 7 is a bottom plan view of the port-operating piston; and Fig. 8 is an elevation view of the port-operating piston, illustrating the opening in the side thereof for the passage of the fuel.

The cylinders, 1, of the engine are cast with the usual water jackets, 2, surrounding each cylinder. The usual power-piston, 3, provided with compression rings, 4, is fitted within the cylinder and connected to the crankshaft, 5, by the usual connecting rod, 6, wrist pin, 7, and bearing, 8. Near the upper end of the cylinder, which is cast open, are provided a port, 9, for the admission of fuel, and a port, 10, for exhausting the burned gases. These ports are preferably arranged on opposite sides of each cylinder with the inlet port at a somewhat higher elevation than the exhaust port, and they extend from the exterior of the cylinder casting into the cylinder proper. In order to secure the greatest cross sectional area of port with the least vertical opening, thereby minimizing the vertical movement of the port-operating piston to open and close the ports, I prefer to extend the ports circumferentially around the cylinder in the form of slots. By reference to Figs. 4 and 5 it will be observed that the inlet port extends circumferentially about 90 degrees and, in order to provide perfect scavenging, I prefer to extend the exhaust port about twice this angular distance. Where structural strength requires, these circumferential slots may be subdivided by partitions, 34, as shown in Fig. 4. Within the cylinder, at its upper end, is fitted the port-operating piston, 11, in which the skirt, 12, extends upwardly from the head, 13, and is fitted with compression rings, 14. It is well known that considerable trouble is experienced wherever compression rings operate past slots in the cylinder wall and I therefor prefer to place my compression rings, 14, on the piston, 11, so that they are at all times above the slotted ports. Because of the relatively slow movement and short stroke of the port-operating piston, as will appear more fully as the description proceeds, and because of the relatively low temperature at which this piston and the cylinder walls surrounding it can be maintained, I can fit this piston to the cylinder with very little clearance, so that by placing the compression rings entirely above the ports to retain a film of lubricating oil between the piston and the cylinder wall I secure a gas-tight fit without the objectionable feature of having the compression rings operate past the slots.

This arrangement of the compression rings is obviously not essential to the successful operation of my engine as it is possible to have them operate past the ports, and they may, therefore, be placed on the port-operating piston at any position desired. Rising from the head of the port-operating piston, at its center, is a stem, 15, which is preferably cast integral with the piston and is angular in cross section as shown in Figs. 6 and 7. The port-operating piston is also preferably provided with radial strengthening and cooling ribs, 16, cast integral therewith. The top of the cylinder, above the port-operating piston, is provided with a guide plate, 17, extending across the cylinder and secured thereto, and having at the center of the cylinder an angular opening adapted to allow the stem of the port-operating piston to pass therethrough. While the piston, 11, will be prevented from turning in the cylinder by the line of positive contact, 37, between the cam follower and the cam, and thus maintain the slot, 25, in operative alignment with the inlet port, I prefer to provide an additional means for this purpose by making the opening in the plate, 17, of the same angular form as the stem, 15, and providing a running fit between the stem and the plate. I also prefer to have the plate, 17, slightly depressed at 18, about the stem, 15, to receive the helical spring, 19, which maintains the port-operating piston in positive cooperation with the cam.

At a suitable distance above the top of the cylinder, depending upon the size of the cam required to secure smooth operation, is the camshaft, 20, arranged parallel to the crankshaft, 5, and carrying the cam, 21, which is disposed over the center of the cylinder and guides, controls and sometimes actuates, the port-operating piston, through the stem, 15. The camshaft and its attachments must be sufficiently strong to sustain the thrust due to the explosion of the gas in the cylinders, and is preferably provided with bearings, 23, at each side of each cylinder. The port-operating piston, between two of the radial webs, 16, is provided with a passage, 24, extending from a horizontally disposed slot, 25, in the side of the piston downwardly to the opening, 26, in the head of the piston. The slot, 25 in the side of the piston extends circumferentially about 90 degrees and is adapted to register with the inner end of the inlet port, 9, so that the fuel may flow therethrough into the combustion chamber, 35. By thus drawing the relatively cool fuel through the port-operating piston, discharging the hot exhaust below the head thereof, and providing a piston having a minimum surface in contact with the hot gases of the combustion chamber, I not only maintain my port-operating piston at a relatively low temperature, with the advantages mentioned above, but I attain this result in an efficient manner because the heat thus removed from the port-operating piston is transferred to the incoming fuel.

It will be noted, by comparing the relative sizes of the opening, 26, in the head of the piston and the slot, 25, in the side or skirt of the piston, (see Figs. 7 and 8), that the passage, 24, becomes somewhat restricted where it opens into the combustion chamber. I consider the tapering of this passage an important feature of my invention as it not only permits a greater quantity of fuel to be drawn into the combustion chamber in a given time than a passage of uniform cross section, but it also causes a finer breaking up of the particles of fuel due to the high velocity attained by the fuel as it passes through the orifice, 26, and its rapid expansion in the combination chamber.

The camshaft, 20, is connected to the crankshaft, 5, by any well known means, such as a train of gears, or chain and sprocket wheels, in such a ratio that the camshaft rotates at one-half the speed of the crankshaft. Such a connection is shown in a conventional manner in Figs. 1, 2, and 4, by 27, which represents a chain running over the sprocket wheels, 28 and 29, connected to the crankshaft and camshaft respectively.

In order to confine the noises resulting from the operation of the cams as much as possible, I prefer to enclose the cams by the cover, 36.

By referring to Fig. 3, the sequence of the different features of the cycle of the engine will appear by following around the cam in a counter-clockwise direction from the point, A. It will be evident to one skilled in the art that the port openings and closings may take place at other points than those illustrated, and they may be made to occur in shorter or longer intervals of time, all depending upon the design of the cam. I, therefore, do not wish to limit the scope of my invention in any way to the particular cam illustrated.

Fig. 1 illustrates the relative position of the various parts of my motor when the crankshaft is on upper dead center and about to begin the fuel intake stroke. In this position, both the inlet and exhaust ports, 9 and 10, respectively, are closed, and it will be noted that portions of the port-operating piston overlap the ports to some extent, as shown at 30 and 31, (Fig. 1), in order to provide a tight seal. This overlap may be varied if necessary to provide a proper seal, but I prefer to keep it as small as possible to reduce the travel of the port-operating piston. As the crankshaft rotates in the direction of the arrow, 32, the camshaft rotates at one-half the crankshaft speed in the direction of the arrow, 33, and the cam, 21, would ordinarily tend to depress the port-operating piston, through the cam follower, 22, and the stem, 15. It will be evident, however, that as the power piston moves downwardly in the cylinder it moves away from the head of the slower moving port-operating piston, thereby creating a vacuum in the combustion chamber. With the cam design as illustrated, this vacuum increases from the dead center position, illustrated in Fig. 1, until the crankshaft has rotated about 15 degrees, at which point the intake port begins to open. That is, in the particular embodiment shown, it requires about 15 degrees of crank travel to take up the overlap, 31. On account of this vacuum in the combustion chamber, it is clear that the atmospheric pressure, acting upon the upper side of the port-operating piston, will tend to depress it against the compression of the spring, 19, and thus assist in its normal operation.

As the crankshaft continues its rotation, the pistons assume the relative positions shown in Fig. 2, with the inlet port fully open after the crankshaft has travelled about 44 degrees The inlet port remains fully open during about 102 degrees of crankshaft rotation, at which point, illustrated in Fig. 2, the inlet port is about to begin its closing. The port-operating piston returns to the position illustrated in Fig. 1, after the crankshaft has rotated about 190 degrees from upper dead center or, at a point 10 degrees past bottom dead center. The port-operating piston remains in this position during the next 306 degrees of crank rotation, during which, the gas is compressed, ignited at the proper instant by ignition means, introduced through the opening, 34, and expanded to produce the power stroke of the engine. During the compression, ignition and expansion, the cam follower is traveling on the 153 degree arc of the cam as illustrated in Fig. 3.

Following the ignition, the power piston is forced downwardly by the expansion of the gases and the port-operating piston remains stationary until the crankshaft has traveled about 136 degrees past top dead center. At this point, the port-operating piston begins to move upwardly until the exhaust port is fully open which occurs after a crankshaft travel of about 170 degrees past top dead center, or 10 degrees before bottom dead center. It will be obvious that the port-operating piston will be forced upwardly by the pressure of the expanded gas in the cylinder and the spring 19, and, that the cam will simply control the extent and rate of the movement. Thus it will be apparent that I directly utilize the natural forces developed in the cylinder to aid the opening of the exhaust port.

By reference to Fig. 5, it will be noted that the inlet port tapers from the exterior of the cylinder casting to the interior of the cylinder wall where it comes in registration with the slot, 25, in the port-operating piston, and that this taper is carried through the port-operating piston to the combustion chamber, as described above, thus providing a perfectly smooth passageway for the ingress of the fuel gas.

It is also to be noted that my port-operating piston is very positive in its action. By providing the stem, 15, in the center of the piston and surrounding it with the helical spring, 19, compressed between the guide plate, 17, and the cam follower, 22, I avoid any eccentric forces acting upon the port-operating piston which would tend to cause it to bind in the cylinder or cause unequal wear on different portions of the piston or cylinder.

Having thus described my invention, what I claim and desire to protect by Letters Patent is:

1. An internal combustion engine comprising a cylinder provided with an exhaust port and an inlet port; a power piston and a reciprocating port-operating piston, forming a combustion chamber therebetween, fitted within said cylinder; the exhaust port opening into the combustion chamber below and adjacent the head of the port-operating piston, and the inlet port opening above the head of said piston; the port-operating piston being provided with means for allowing the fuel to flow into the combustion chamber; and means for controlling the reciprocation of the port-operating piston at predetermined times to open and close the ports.

2. In an internal combustion engine, a port-operating piston provided with a continuous passage extending from the side of said piston through the head thereof, for the ingress of the fuel; said passage being smaller at the head than at the side of the piston.

3. In an internal combustion engine, a port-operating piston provided with a continuous passage of varying cross section extending from the side through the head thereof for the ingress of fuel, and having a centrally disposed stem adapted to cooperate with means for controlling the movements of the piston.

4. In an internal combustion engine provided with inlet and exhaust ports, and a power piston, means independent of said piston for effecting the opening and closing of the exhaust port and enclosing within itself a continuous passage for placing the inlet port in communication with the combustion chamber, the cross sectional area of said passage being smallest at the fuel exit whereby a finer dissemination of fuel particles is obtained.

5. In an internal combustion engine, a port-operating piston provided with a continuous passage extending from the side through the head thereof for the ingress of fuel; said passage being tapered in the direction of the flow of the fuel.

6. In an internal combustion engine, a cylinder, a power piston and a reciprocating port-operating piston fitted within said cylinder and forming a combustion chamber therebetween; said cylinder being provided with an exhaust port, opening between the heads of said pistons and an inlet port opening into the combustion chamber through said port-operating piston; the exhaust port opening with an upward movement of the port-operating piston under the pressure of the expanded gases in the cylinder, and the inlet port opening with a downward movement of the port-operating piston assisted by atmospheric pressure; together with means for controlling the movements of the port-operating piston under said pressures and continuing said movements a predetermined time after said pressures cease to act.

7. An internal combustion engine comprising a cylinder provided with inlet and exhaust ports; a power piston and an interruptedly reciprocating port-operating piston fitted in said cylinder and forming a combustion chamber therebetween; the exhaust port opening into the combustion chamber between the heads of said pistons, and the inlet port opening into the cylinder above the head of the port-operating piston; the port-operating piston being provided with means for allowing the fuel to pass therethrough into the combustion chamber; means for preventing the rotation of the port-operating piston; a revolving cam for controlling the reciprocations of said piston; and means for maintaining said port-operating piston in positive cooperation with said cam.

8. An internal combustion engine comprising a cylinder provided with inlet and exhaust ports; a power piston and a reciprocating port-operating piston fitted in said cylinder and having their heads in opposed relation to form a combustion chamber therebetween; the exhaust port opening into the combustion chamber below and adjacent the head of the port operating piston, and the inlet port communicating with the combustion chamber through a continuous passage provided in the port-operating piston; and means for controlling the movements of the port-operating piston to open and close the ports at predetermined times.

9. In an internal combustion motor, a cylinder provided with inlet and exhaust ports; a power piston and an interruptedly reciprocating port-operating piston fitted within the cylinder and forming a combustion chamber therebetween; the exhaust port opening into the combustion chamber between said pistons, and the inlet port opening into a continuous passage in said port-operating piston communicating with the combustion chamber, said passage being tapered in the direction of the flow of the fuel; and a revolving cam in positive cooperation with the port-operating piston for controlling the opening and closing of the ports.

10. An internal combustion engine comprising a cylinder with inlet and exhaust ports and having a power piston and a reciprocating port-operating piston fitted therein, the second piston being capable of setting up or cutting off communication between the combustion chamber and the ports; the communication between the inlet port and the combustion chamber being through the port-operating piston and the communication between the exhaust port and the combustion chamber being direct; and means for positively controlling the movements of the last mentioned piston.

11. An internal combustion engine comprising a cylinder having an inlet port in free communication with a source of fuel, and an exhaust port in free communcation with an exhaust receiver; a power piston and a reciprocating port-operating piston fitted within said cylinder and forming a combustion chamber therebetween; the exhaust port opening directly into the combustion chamber and near the top thereof, and the inlet port communicating with the combustion chamber through a continuous passage provided in the port-operating piston; means for controlling the reciprocations, and interrupting the movement, of the port-operating piston at proper intervals; means for maintaining the port-operating piston in cooperative relation with the last mentioned means; and centrally disposed means for maintaining the port-operating piston in cooperative alignment with the inlet port.

12. An internal combustion engine comprising a cylinder with inlet and exhaust ports and having a power piston and a port-operating piston fitted therein and forming, between their heads, a combustion chamber; the second piston being capable of setting up or cutting off communication between the combustion chamber and the ports, and moving entirely away from the exhaust port when it is opened; the last mentioned piston having a substantial portion, above the head thereof, in contact with the incoming fuel whereby it is cooled.

13. An internal combustion engine comprising a cylinder provided with inlet and exhaust ports near the upper end thereof in direct communication with a source of fuel and an exhaust receiver respectively; a power piston and a reciprocating port-operating piston fitted within said cylinder and having their heads in opposed relation to form a combustion chamber therebetween; the opening of the exhaust port being directly into the combustion chamber and effected by the pressure of the expanded gases in the cylinder, and the opening of the inlet port being through the port-operating piston and aided in part by atmospheric pressure; a revolving cam in cooperation with centrally disposed means on said port-operating piston for controlling the movements of said piston; and means for maintaining a positive cooperative relation between the cam and the port-operating piston.

14. An internal combustion engine comprising a power piston and a movable inverted port-operating piston fitted within a cylinder provided with an exhaust port in direct communication with an exhaust receiver and opening into the cylinder between the heads of said pistons, and an inlet port in direct communication with a source of fuel and opening above and through the head of the port-operating piston; a cam in cooperation with centrally disposed means on the port-operating piston for positively controlling the movements thereof; and centrally disposed resilient means for maintaining contact between the cam and the first mentioned means.

15. An internal combustion engine comprising a cylinder having inlet and exhaust ports in the upper part thereof; a power piston and a reciprocating port operating piston fitted within said cylinder and forming a combustion chamber between their heads; and means for controlling, and at times, actuating, the movements of the port-operating piston to set up or cut off communication between the combustion chamber and the ports; the port-operating piston moving upwardly to a point beyond the exhaust port to provide direct communication between said port and the combustion chamber, and downwardly to cut off said communication and to effect the opening of the inlet port through a passage provided in said piston.

16. An internal combustion engine comprising: a cylinder provided with a combustion chamber and inlet and exhaust ports, and having a power piston fitted therein; reciprocating means operating under pressure of the expanded gas to open the exhaust port between said means and said piston directly into the combustion chamber, and enclosing within itself means for establishing communication between the inlet port and the combustion chamber; and means for timing the movement of the first mentioned means under said pressure.

17. In an internal combustion engine of the character described, the combination of a revolving cam in cooperation with an interruptedly reciprocating port-operating piston through centrally disposed means on said piston; and means substantially concentric and cooperating with the first mentioned means for maintaining the piston in positive cooperation with said cam; whereby the piston is maintained in precise alignment with the cylinder.

18. In an internal combustion engine the combination with a cylinder substantially coextensive with the stroke of a power piston fitted therein, of means above said cylinder laterally enclosing a combustion chamber and having inlet and exhaust ports provided therein; a reciprocating means fitted within the first mentioned means and operated by gas pressure to open the exhaust port between said reciprocating means and the power piston and enclosing within itself means for effecting communication between the inlet port and the combustion chamber.

19. In an internal combustion engine the combination with a cylinder having a power piston fitted therein, of an open cylinder portion above said piston provided with inlet and exhaust ports; means fitted within and forming a closure for said portion and adapted to reciprocate therein to effect the opening of the ports, said means enclosing within itself a passage for the inflow of fuel, and moving beyond the exhaust port to effect a direct opening thereof; and means for timing the exhaust opening movement of the first mentioned means.

20. In an internal combustion engine having a combustion chamber and a power piston, and provided with a fuel intake passage adapted to be placed in communication between said chamber and a source of fuel by means independent of said piston, said passage being characterized by a venturi-like contraction therein having its stricture at the entrance to the combustion chamber, whereby the normal flow from the entrance is increased and a better commingling of the particles of fuel is obtained.

FRANK C. ALARIE.